United States Patent [19]

Kurihara

[11] Patent Number: 5,736,944
[45] Date of Patent: Apr. 7, 1998

[54] IMAGE DECODING APPARATUS

[75] Inventor: Kouichi Kurihara, Kanagawa-ken, Japan

[73] Assignee: Kabushiki Kaisha Toshiba, Kawasaki, Japan

[21] Appl. No.: 630,208

[22] Filed: Apr. 11, 1996

[30] Foreign Application Priority Data

Apr. 14, 1995 [JP] Japan ................... 7-089085

[51] Int. Cl.⁶ .................................................. H03M 7/00
[52] U.S. Cl. .................................................. 341/50
[58] Field of Search ............................. 341/50, 81, 106; 348/401

[56] References Cited

U.S. PATENT DOCUMENTS

| 5,146,325 | 9/1992 | Ng .................. | 358/135 |
| 5,461,420 | 10/1995 | Yonemitsu et al. ... | 348/401 |
| 5,539,466 | 7/1996 | Igrashi et al. ...... | 348/401 |

FOREIGN PATENT DOCUMENTS

| 5-91341 | 4/1993 | Japan ................ | H04N 1/41 |
| 6-98311 | 4/1994 | Japan ................ | H04N 5/92 |
| 6-338918 | 12/1994 | Japan ................ | H04L 29/06 |
| 7-212399 | 8/1995 | Japan ................ | H04L 12/56 |

OTHER PUBLICATIONS

P1394 Standard for a High Performance Serial Bus, IEEE Standards, P1394 Draft 8.0v4, Nov. 21, 1995, (Complete Copy with relevant pages circled in Table of Contents).

Kunzman et al., "1394 High Performance Serial Bus: The Digital Interface for ATV", Reprinted with Permission of the IEEE, presented at the International Conference on Consumer Electronics, Chicago, ILL. Jun. 1995.

Hoffman et al., "IEEE 1394: A Ubiquitous Bus", Presented at COMPCON Spring 1995, San Francisco, CA.

*Primary Examiner*—Jeffrey A. Gaffin
*Assistant Examiner*—Peguy JeanPierre
*Attorney, Agent, or Firm*—Cushman Darby & Cushman IP Group of Pillsbury Madison & Sutro LLP

[57] ABSTRACT

A decoding output of a B-picture is given to a memory. A memory control circuit divides a one (1) image plane to four (4) regions. Write is executed to the memory for the divided image data that are the decoding output with respect to eight (8) regions of first and second fields. The time at which each of the divided image data are retained in the memory is decided in accordance with the field to which the divided image data belongs and a position on an image plane. On the basis of this, subsequent to the readout of the divided image data, the other divided image data are written to a common storage region of the memory. Thus, a total memory capacity is reduced to enable interlacement conversion.

8 Claims, 13 Drawing Sheets

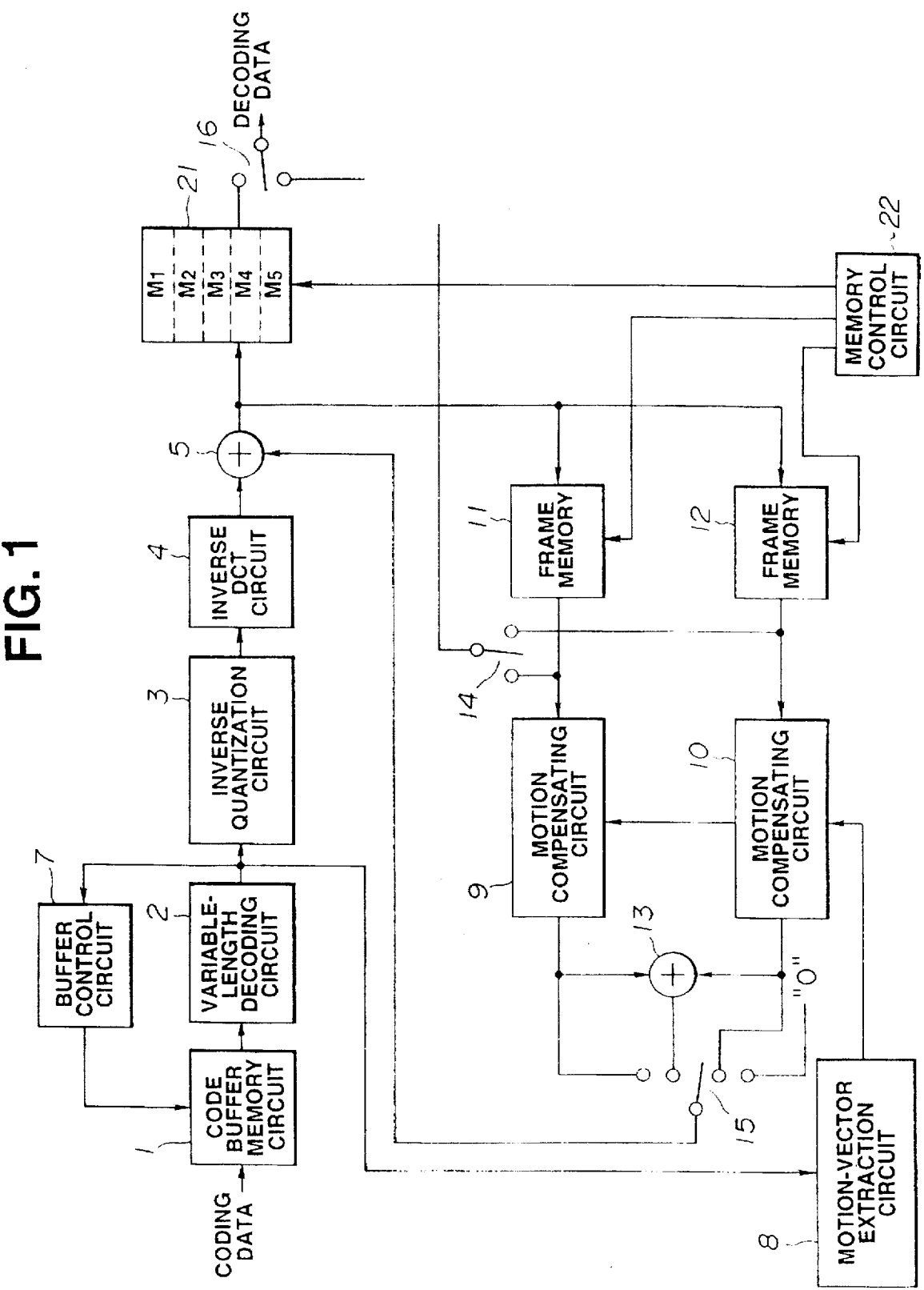

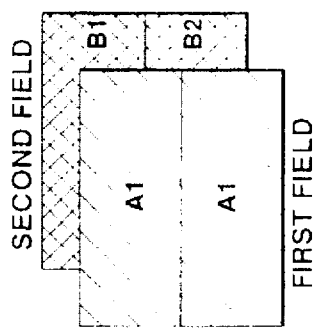
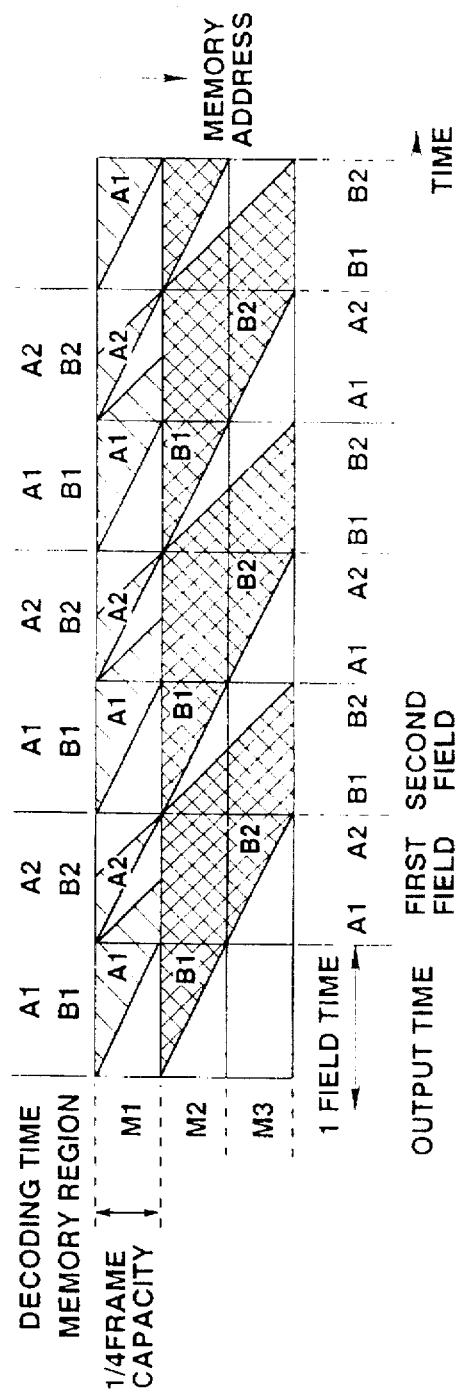
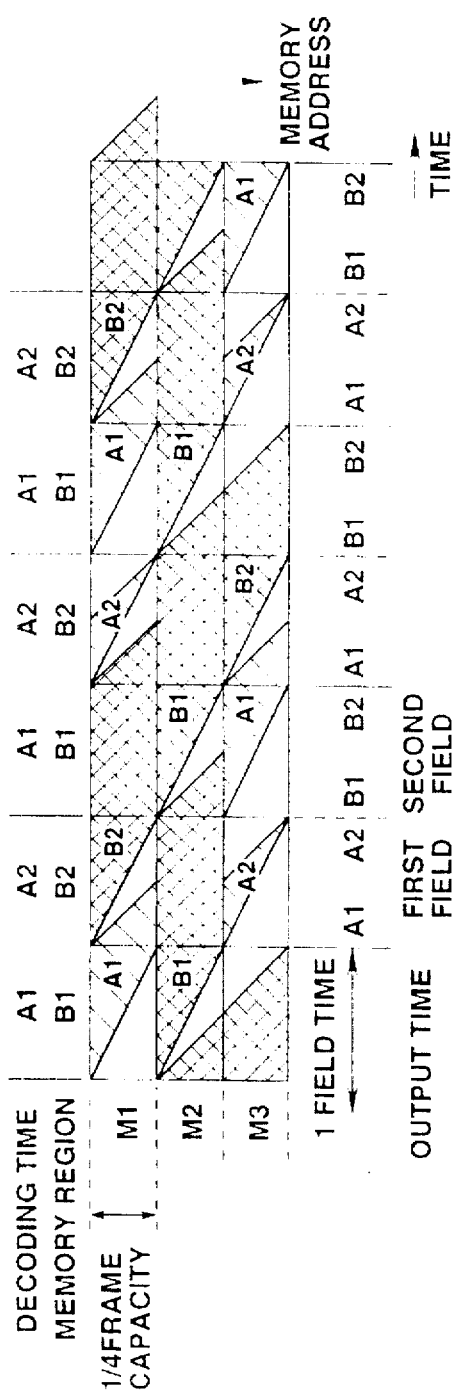

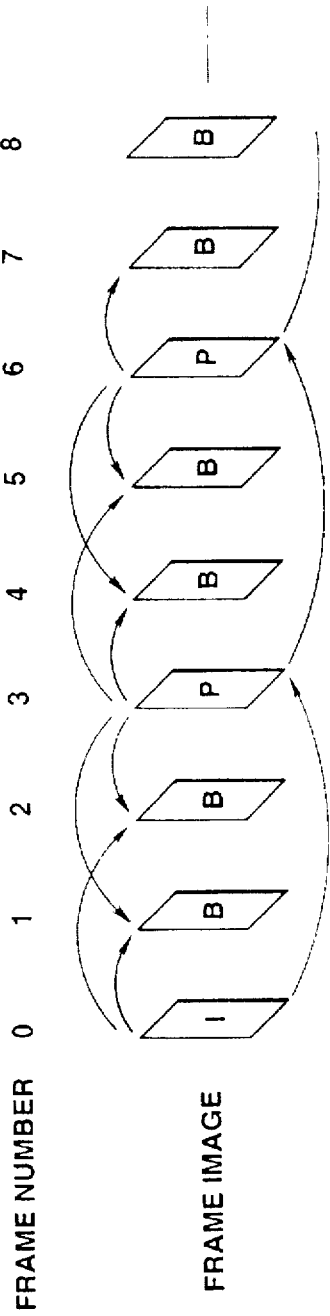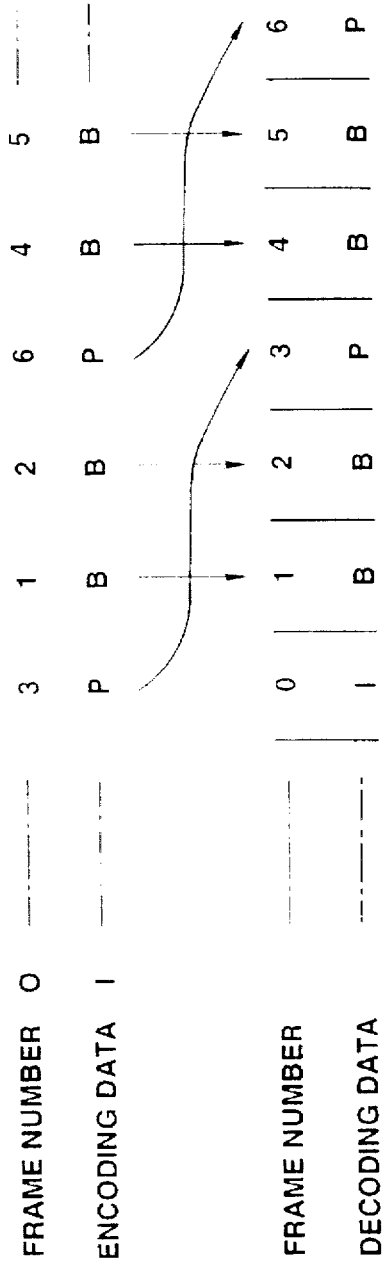
FIG.9A (PRIOR ART)
FIG.9B (PRIOR ART)
FIG.9C (PRIOR ART)

IMAGE DECODING APPARATUS

BACKGROUND OF THE INVENTION

1. Field of the Invention

The invention relates to an image decoding apparatus for decoding coding data which include bidirectional predictive coding data.

2. Related Art Statement

In recent years, in keeping with the establishment of a high efficient coding technique of an image, digital processing of the image has been diffused. The high efficient coding technique enables image data to be coded at a lesser bit rate, in order to improve efficiency of digital transmission, digital recording and the like. In this high efficient coding, orthogonal transformation of DCT (Discrete Coding Transformation) processing or the like is executed by a block unit of m×n picture elements. The orthogonal transformation converts an input sampled value into an orthogonal component such as a spatial frequency component or the like. Thus, it is possible to delete a spatial correlation component. The component which has orthogonally been transformed is quantized, whereby it is possible to reduce the redundancy of a signal of the block.

Further, variable-length coding, such as Hafman coding or the like is applied to a quantization output, whereby it is possible to further reduce an amount of data. The Huffman coding is one in which coding is executed on the basis of results which are computed from an amount of statistical coding of the quantization output. By the variable-length coding in which a short bit is allocated to data which are high in occurrence or appearance probability, while a long bit is allocated to data which are low in appearance probability, the overall amount of data is reduced.

Moreover, in an apparatus which executes the high efficient coding, a hybrid system which is considered in an MPEG (Moving Picture experts group) or the like has become common. In this system, in addition to an intra-frame compression, which processes in DCT the image within a frame, an inter-frame compression in which a correlation between the frames is utilized to reduce the redundancy in a direction of a time axis is also adopted. The intra-frame compression utilizes a property wherein general animation images in a frame resemble other images in preceding and following frames, to find out a difference between the preceding and following frames, to code a difference value (predictive error) to thereby further reduce the bit rate. Particularly, motion compensating inter-frame protective coding is effective which predicts motion of the image to find out an inter-frame difference to thereby reduce the predictive error.

In this manner, in the hybrid system, in addition to the intra-frame coding in which the image data of the predetermined frame are processed in DCT as they are so as to be coded, predictive coding is also adopted in which only the difference data between the image data of the predetermined frame and reference image data of frames before and behind this frame are processed in DCT and are coded. As a predictive coding method, there are forward predictive coding which compensates, in motion, reference image data in a direction forward in view of time, to find out a predictive error, rearward predictive coding which compensates, in motion, reference image data in a direction rearward in view of time, to find out a predictive error, and bidirectional predictive coding which, in consideration of coding efficiency, uses an average in any one of the forward, rearward and in both directions.

Since the frame which is coded by the intra-frame coding (hereinafter referred to as "I-picture") is coded only by intra-frame information, the frame can be decoded only by single or sole coding data. Accordingly, in an MPEG standard, the arrangement is such that, in order to prevent error propagation or the like, the single I-picture is inserted in a fixed period (12 frames, for example). In the MPEG standard, an inter-frame coding frame (hereinafter referred to as "P-picture") is obtained by the forward predictive coding which uses this I-picture. In this connection, the P-picture is also obtained by the fact that a forward P-picture is coded in forward prediction. Furthermore, a bidirectional prediction adaptive change-over frame (hereinafter referred to as "B-picture") is obtained by bidirectional predictive coding which uses the I- and P-pictures in a direction of any one or both of the forward and the rearward directions.

FIGS. 9A–9C are explanatory views for describing a compression method of this system. FIG. 9A shows input frame images, and FIG. 9B shows coding data, while FIG. 9C shows decoding data. Further, FIG. 10 is an explanatory view for describing blocking thereof.

A frame image whose frame number is 0 is coded in intra-frame. This frame image is used as a reference image, to code, in forward prediction, a frame image whose frame number is 3. Arrows in FIG. 9B show predictive directions of such coding. A frame image whose frame number is 6 is also coded, in forward prediction, with the forward frame image whose frame number is 3 serving as the reference image. Moreover, frame images whose frame numbers are 1 and 2 are coded, in bidirectional prediction, with frame images whose frame numbers are 0 and 3 serving as the reference images. Furthermore, frame images whose frame numbers are 4 and 5 are coded, in bidirectional prediction, with frame images whose frame numbers are 3 and 6 serving as the reference images.

Specifically, as shown in FIG. 9B, first, the image data whose frame number is 0 are coded in inter-frame to obtain the I-picture. In this case, the image data whose frame number is 0 are framed by a memory or the like and, as shown in FIG. 10, the image data are blocked every 8 picture elements×8 lines. DCT processing is applied thereto in a block unit. In this connection, in the figures, ODDs shown by solid lines indicate scanning lines of odd fields, while EVENs shown by broken lines indicate scanning lines of even fields. A DCT conversion coefficient, which is obtained by the DCT processing, has been quantized by the use of a predetermined quantization coefficient and, thereafter, the variable-length coding is applied thereto to obtain coding data.

Regarding the subsequently input frame image whose frame number is 1, the bidirectional predictive coding is executed which uses the frame image whose frame numbers are 0 and 3. Accordingly, the frame image whose frame number is 3 is retained or held in the memory until the frame image whose frame number is 1 is coded. Similarly, the frame image whose frame number is 2 is coded after coding of the frame image whose frame number is 3. Regarding the frame image whose frame number is 3, the forward predictive coding is executed which uses the frame image whose frame number is 0, as the reference image, to obtain the P-picture (FIG. 9B). Specifically, the image data whose frame number is 0 is compensated in motion by the use of a motion vector, and a difference (predictive error) between the reference image data which are compensated in motion and image data of the present frame (frame whose frame number is 3) is processed in DCT. It is similar to the intra-frame coding in that the DCT conversion coefficient is quantized and, thereafter, is coded in variable-length.

The I-picture and the P-picture whose frame numbers are 0 and 3, which have already been coded, are used to sequentially code in bidirectional prediction the frame images whose frame numbers are 1 and 2. Thus, as shown in FIG. 9B, two B-pictures are obtained. Similarly, as shown in FIG. 9B, coding is executed in the order of frame images whose frame numbers are 6, 4, 5, . . . , to obtain a P-picture, a B-picture, a B-picture, . . . .

In this manner, upon coding, coding is executed in a frame order which is different from the actually input frame order. It is necessary that, upon decoding, the decoding order of the coding data is returned to original one to output decoding data in order of 0, 1, 2, . . . of frame numbers.

FIG. 11 is a block diagram showing a related technique of such image decoding apparatus. Further, FIGS. 12A and 12B are explanatory views for describing the framing. FIG. 12A shows framing upon non-interlacement scanning, while FIG. 12B shows framing upon interlacement scanning.

Coding data are given to a code buffer memory circuit 1. The coding data are obtained such that, in the coding order shown in FIG. 9B, the image data or the predictive errors are processed in DCT and are quantized and, thereafter, are coded in variable length. The code buffer memory circuit 1 retains or holds the input coding data, and executes time setting between decoding processing time and output processing time to output the same to a variable-length decoding circuit 2. The variable-length decoding circuit 2 decodes, in variable length, the coding data to output the same to an inverse-quantization circuit 3 and a buffer control circuit 7. The code buffer memory circuit 1 is controlled by the buffer control circuit 7.

An output from the variable-length decoding circuit 2 is inverse-quantized by the inverse-quantization circuit 3, processed in inverse DCT by an inverse DCT circuit 4, and returned to data prior to the DCT processing on the side of the coding. Now, it is supposed or assumed that the I-picture that is the coding data whose frame number is 0 is input. In this case, the output from the inverse DCT circuit 4 is a restored image whose frame number is 0, and the output from the inverse DCT circuit 4 is given to a frame memory 6 as it is.

The output from the inverse DCT circuit 4 is a picture-element data in the block unit. The frame memory 6 retains or holds picture element data for one (1) frame. As will be described later, the frame memory 6 has four (4) regions of M1 to M4. In a case where non-interlacement display is executed, as shown in FIG. 12A, the frame memory 6 arranges the output from the inverse DCT circuit 4 in frame order, and outputs the same in order of raster. Moreover, in a case where the interlacement display is executed, as shown in FIG. 12B, the frame memory 6 arranges the output from the inverse DCT circuit 4 in division to data of odd fields and data of even fields, and outputs the same in order of raster every fields. The output from the frame memory 6 is outputted through a switch 16 as decoding data (FIG. 9C). The restored image data whose frame number is 0, from the inverse DCT circuit 4 are also supplied to a frame memory 12 in order to decode the P- and B-pictures.

In connection with the above, in a case where the DCT block is arranged so as to be blocked after framing, if the non-interlacement display is executed, the picture element arrangement in a line direction need not to be changed. Accordingly, the memory for altering the output order should have a capacity which retains the data for eight (8) lines (one (1) block line). However, in order to enable the interlacement display, it is necessary to divide the picture element arrangement to odd fields and even fields, to output the data. Accordingly, many memories are required. Generally, for this reason, a frame memory is adopted as the memory for altering the display order, whereby framing is made possible.

Subsequently, the P-picture whose frame number is 3 is decoded. In this case, the output from the inverse DCT circuit 4 is a predictive error. On one hand, a motion-vector extraction circuit 8 extracts a motion vector which is included in the output from the variable-length decoding circuit 2, to give the same to a motion compensating circuit 10. The motion compensating circuit 10 reads the restored image data of the I-picture from the frame memory 12, and compensates in motion the same by the use of the motion vector. An output from the motion compensating circuit 10 is given to an adder 5 through a switch 15. The adder 5 adds the restored image data whose frame number is 0, which are compensated in motion, and the predictive error from the inverse DCT circuit 4 to each other to obtain restored image data whose frame number is 3. The data are supplied to a frame memory 11.

Subsequently, the B-picture whose frame number is one (1) is decoded. Also in this case, the output from the inverse DCT circuit 4 is the predictive error. The motion-vector extraction circuit 8 extracts the motion vector between the image whose frame number is 3 and the image whose frame number is 1, from the variable-length decoding output, to give the same to a motion compensating circuit 9. The motion compensating circuit 9 uses this motion vector to compensate, in motion, the restored image data whose frame number is 3, from the frame memory 11, to thereby output the same to an adder 13. The adder 13 adds the outputs from the respective motion compensating circuits 9 and 10 to each other in accordance with the predictive mode upon coding, to supply the same to the adder 5 through the switch 15. The adder 5 adds the output from the switch 15 to the predictive error to obtain the restored image data of the B-picture whose frame number is 1. The image data are given to the frame memory 6 and are framed and, thereafter, are outputted through the switch 16 (FIG. 9C).

Subsequently, the B-picture whose frame number is 2 is decoded. Also in this case, the output from the inverse DCT circuit 4 and the output from the switch 15 are added to each other to obtain the restored image data of the B-picture whose frame number is 2. The image data are given to the frame memory 6 and are framed and, thereafter, are output through the switch 16 (FIG. 9C). Subsequently, as shown in FIG. 9C, the restored image data whose frame number is 3, which are stored in the frame memory 11, are output in display order through a switch 14 and the switch 16, as decoding data.

Subsequently, a similar operation is repeated, and the image data (decoding data) which are restored in decoding order in FIG. 9C are output. In this connection, decoding processing and output processing are controlled while an overlapped part of the memory and operation time within a system are considered.

FIGS. 13A and 13B describe write and readout of the frame memory 6 in a case where the interlacement output is obtained. FIG. 13A shows write and readout of the frame memory 6, while FIG. 13B shows a division method of the image data on a single (1) image plane.

As described above, the frame memory 6 has four regions of M1 to M4. In order that the memory for a single (1) frame is used to interlace the image data of one (1) frame to thereby output the same, it is necessary to execute the write and the readout simultaneously. In view of this, the arrangement is such that the image data of the one (1) frame are divided into four (4) portions, and four (4) regions M1 to M4 are provided to control the write and the readout of every regions.

Specifically, as shown in FIG. 13B, the image data of the first field is divided vertically in the image plane so as to be made into respective data A1 and A2. Further, the image data of the second field is also divided vertically in the image plane so as to be made into respective data B1 and B2. The data A1 and A2 are stored, respectively, in the regions M1 and M2, and the data B1 and B2 are stored, respectively, in the regions M3 and M4.

In a case where the coding data which are coded by the frame arrangement are decoded, the decoding output from the adder 5 is sequentially output in the block unit from the first block line which corresponds to an upper end of the image plane, to the block line which corresponds to a lower end of the image plane. Specifically, in an image decoding apparatus shown in FIG. 11, the data A1 and B1 are decoded in one (1) field period of time, and the data A2 and B2 are decoded in the subsequent one (1) field period of time. An axis of abscissa in FIG. 13A shows decoding time and output time in the field unit, while an axis of ordinate shows memory addresses of the regions M1 to M4 of the frame memory 6. Each of the regions M1 to M4 has a capacity thereof which is ¼ of the full capacity of the frame memory 6.

During the first field period, the data A1 and B1 which are output from the adder 5 are sequentially written to the memories M1 and M3, respectively. Oblique lines K1 and K3 in FIG. 13A show write to the regions M1 and M3. An amount of data of each of data A1 and B1 is ¼ of one (1) frame, and write is executed to the entire regions of the regions M1 and M3 by one (1) field period of time.

During the subsequent one (1) field period, the data A2 and B2 which are output from the adder 5, are written, respectively, to the memories M2 and M4. Oblique lines K2 and K4 in FIG. 13A show write to the regions M2 and M4. An amount of data of each of the data A2 and B2 is ¼ of one (1) frame, and write is executed to all the regions M2 and M4 during one (1) field period.

Further, in this field period, readout from the region M1 is executed. Oblique lines R1 in FIG. 13A shows readout from the region M1. The data are read out from the region M1 in write order so that all the data A1 which are stored in the region M1 are read out during a half field period. An oblique line region in FIG. 13A indicates that the data are under being stored in a predetermined address of the frame memory 6. Moreover, an oblique line R2 in FIG. 13A indicates that the data A2 which are stored in the region M2 are also read out in the latter half of the field period. The data A1 and A2 which are read out in the field period are output as data of the first field.

In the former half of the subsequent field period, the data B1, which is written to the region M3 during the period of oblique lines M3, is read out (oblique line R3), and, in the latter half, data B2 which are written to the region M4 during a period of the oblique lines K4 are read out (oblique lines R4). Thus, the data B1 and B2 are output as data of the second field.

Subsequently, similar write and readout are repeated, and a decoding output of every frame is converted to an interlacement output in every field and is output.

By the way, the P-picture has been decoded by the use of the reference image of the forward frame, and the memory for one (1) frame for retaining the reference image is necessary for decoding. Furthermore, the B-picture has been decoded by the use of the reference images of the forward and rearward frames. Thus, a memory for two (2) frames for holding these reference images is necessary. Further, in view of the fact that the coding processing is executed in the DCT block unit, as described above, a memory for one (1) frame is necessary which frames the output from the adder 5 to enable the interlacement display or the non-interlacement display. In this case, the apparatus in FIG. 11 stores the decoding data of the I- and P-pictures, in the frame memories 11 and 12, because the decoding data of the I- and P-pictures are used as the reference image of the B-picture. Readout from these frame memories 11 and 12 is controlled and is outputted whereby these frame memories 11 and 12 can be used also for framing. Since, however, the decoding data of the B-picture are not used as for the reference image, and are not stored in the frame memories 11 and 12, it is necessary to provide the frame memory 6 for framing.

In this manner, in order to decode the image coding data which include the B-picture, many memories are necessary. Thus, circuit scale increases, and the cost is high.

OBJECT AND SUMMARY OF THE INVENTION

It is an object of the present invention is to provide an image decoding apparatus in which memories which are necessary for decoding of image coding data which include a B-picture, are reduced, whereby the circuit scale can be reduced and the cost can be reduced.

According to the invention, there is provided a decoding apparatus which comprises a decoding unit into which coding data, which includes bidirectional predictive coding data which use forward and rearward reference images, are input, for decoding the input coding data in a predetermined block unit to output decoding data, a memory having a plurality of memory regions each having a capacity corresponding to a part of a predetermined divided number of a total capacity needed to store the decoding data for one (1) frame, to which the decoding data of a frame arrangement which is output from the decoding unit is given by decoding processing with respect to the bidirectional predictive coding data, for storing the same in the memory regions, and for reading out the stored data in display order to thereby obtain an interlacement output, and a control unit for dividing an image plane into image regions whose number is ½ of the predetermined divided number in correspondence to a position in a vertical direction, to control write and readout of the memory for every divided image data that are a column of the decoding data which correspond, respectively, to the divided image regions of the predetermined divided number of first and second fields, the control unit controlling write and readout with respect to the memory in consideration of input and output time of the divided image data, to thereby store a plurality of divided image data corresponding, respectively, to different divided image regions, to a common memory region of the memory to obtain an interlacement output from the memory.

Other features and advantages of the present invention will sufficiently become apparent from the following explanation.

BRIEF DESCRIPTION OF THE DRAWINGS

FIG. 1 is a block diagram showing a first embodiment of an image decoding apparatus according to the present invention;

FIGS. 8A-8C are explanatory views for describing the operation of the third embodiment in FIG. 7;

FIGS. 9A-9C are explanatory views for describing predictive coding;

DETAILED DESCRIPTION OF THE PREFERRED EMBODIMENTS

Figure 11:
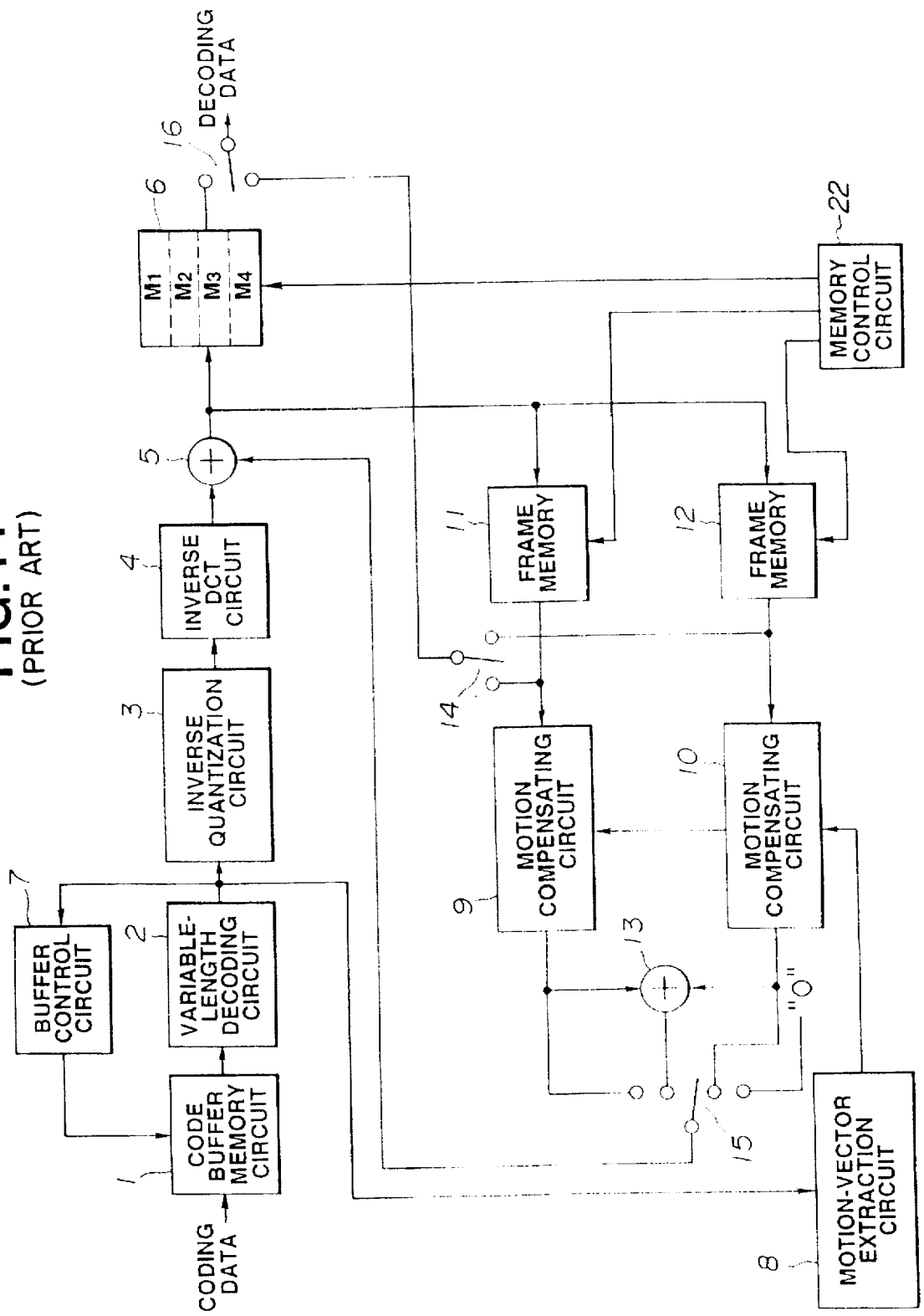
FIG. 11 is a block diagram showing a related art of the image decoding apparatus.
Figure 12A:
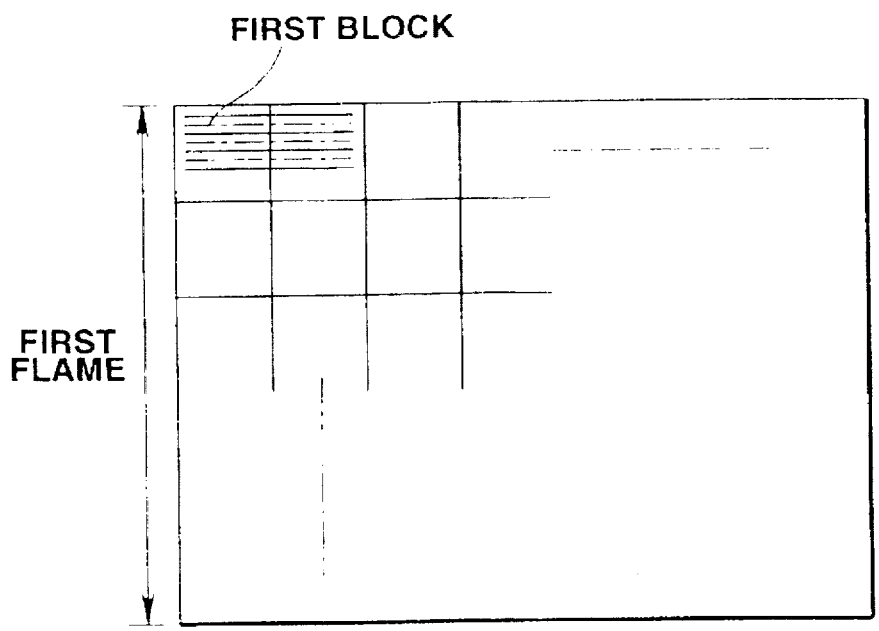
FIGS. 12A and 12B are explanatory views for describing framing.
Figure 12B:
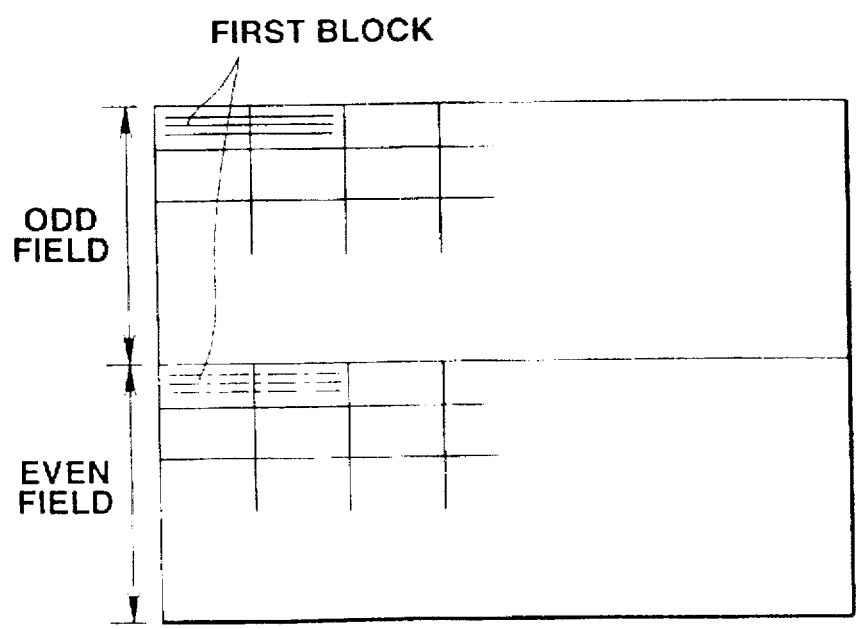

FIG. 1 is a block diagram showing an embodiment of an image decoding apparatus according to the present invention. In FIG. 1, the same reference numerals are applied to common component elements as those in FIG. 11.

Coding data is supplied to the code buffer memory circuit 1. The coding data is created by DCT processing, quantization processing and variable-length coding processing, and has an I-picture due to intra-frame processing, a P-picture which uses a reference image of forward or rearward frame, and a B-picture which uses a reference image in a bidirectional frame. Further, the coding data also includes information of a motion vector which is used upon creation of the P- and B-pictures. In this connection, the DCT processing is executed in a block unit which has been obtained by framing and, thereafter, blocking.

The code buffer memory circuit 1 retains or holds input coding data, and executes time setting between decoding processing time and output processing time to output the same. An output from the code buffer memory circuit 1 is given to the variable-length decoding circuit 2. The variable-length decoding circuit 2 returns the input coding data to data prior to the variable-length coding processing on the coding side by the variable-length decoding processing, to output the same to the buffer control circuit 7, the inverse quantization circuit 3 and the motion-vector extraction circuit 8. The buffer control circuit 7 is adapted to control the code buffer memory circuit 1 on the basis of an output from the variable-length decoding circuit 2.

The motion-vector extraction circuit 8 extracts the motion vector, which is included in the variable-length decoding output, regarding the P- and B-pictures, to output the same to the motion compensating circuits 9 and 10. The inverse quantization circuit 3 processes, in inverse quantization, the input data, to give the same to the inverse DCT circuit 4. The inverse DCT circuit 4 processes, in inverse DCT, the inverse quantization output to output the same to the adder 5.

An output from the switch 15 is also given to the adder 5. In a case where an output from the inverse DCT circuit 4 is based on the I-picture, the switch 15 gives 0 to the adder 5, and gives an output from one of the motion compensating circuits 9 and 10 to be described later to the adder 5 in a case where the output from the inverse DCT circuit 4 is based on the P-picture. While, in a case where the output from the inverse DCT circuit 4 is based on the B-picture, the switch 15 gives the outputs from the motion compensating circuits 9 and 10 or an output from the adder 13 to be described later, to the adder 5. The adder 5 adds the output from the inverse DCT circuit 4 and the output from the switch 15 to each other to thereby restore the image to output the same to the frame memories 11 and 12 and to output the same to a memory 21.

Write and readout are controlled by a memory control circuit 22 so that the frame memories 11 and 12 retain the restored image data of the I- and P-pictures that become the reference image. The arrangement is such that the frame memories 11 and 12 output the reference image data which are held at the decoding timing of the corresponding P- and B-pictures, to the motion compensating circuits 9 and 10. The motion compensating circuits 9 and 10 compensate, in motion, the reference image data from the respective frame memories 11 and 12, on the basis of the motion vector from the motion-vector extraction circuit 8 to output the same. Outputs from the respective motion compensating circuits 9 and 10 are supplied to the switch 15, and are supplied also to the adder 13. The adder 13 is arranged so as to add the outputs from the respective motion compensating circuits 9 and 10 to each other in accordance with the predictive mode to output the same to the switch 15.

The memory 21 is divided into a plurality of memory regions. Each of the memory regions has a capacity that is one of the predetermined divided number (image plane divided number×one second to be described later) of a total capacity which stores therein the image data for one (1) frame (hereinafter referred to as the "frame capacity"). In this connection, FIG. 1 shows an example in which the memory 21 is arranged by five (5) regions M1 to M5 each having a capacity one eighth (⅛) of the frame capacity. Specifically, in this case, the capacity of the memory 21 is ⅝ (five eighth) of the frame capacity. As will be described later, the memory 21 is arranged such that write and readout thereof are controlled by the memory control circuit 22 to store the decoding data of the B-picture which is input sequentially, to thereby read out the same in interlacement order to output the same to the switch 16.

On one hand, the arrangement is such that, regarding the I- and P-pictures, restored image data which are stored in the frame memories 11 and 12 are used. The frame memories 11 and 12 are controlled in write and readout thereof by the memory control circuit 22, and read out the stored restored image data in interlacement order to output the same to the switch 14. The switch 14 is changed over in accordance with the output frame order of the image, and outputs the image data from the frame memories 11 and 12 to the switch 16. The arrangement is such that the switch 16 is changed over in accordance with output frame order of the image, to output the restored image data of a series of frames as decoded data.

The memory control circuit 22 is arranged so as to divide the first and second fields vertically of the respective image planes, by the predetermined image-plane divided number, to execute a write operation with respect to the memory 21 for every one of the divided image data, which correspond respectively to the divided regions. For example, it is assumed that the image-plane divided number is four (4), that the divided image data which correspond respectively to four (4) of the first to fourth regions of the first field are A1 to A4, and that the divided image data which correspond respectively to four (4) of the first to fourth regions of the second field are B1 to B4. In this case, the memory control circuit 22 writes the divided image data A1, A3 and A4 to the region M1 of the memory 21, writes the divided image data B1 to the region M2, and writes the divided image data B2 to the region M3, for example. Further, the memory control circuit 22 is arranged so as to make the divided image data A2 to a group or set with respect to the divided image data A3 or A4 to write the same to the region M4 or M5, and to write the remaining divided image data A3 or A4 to the region M5 or M4.

Figure 2A:
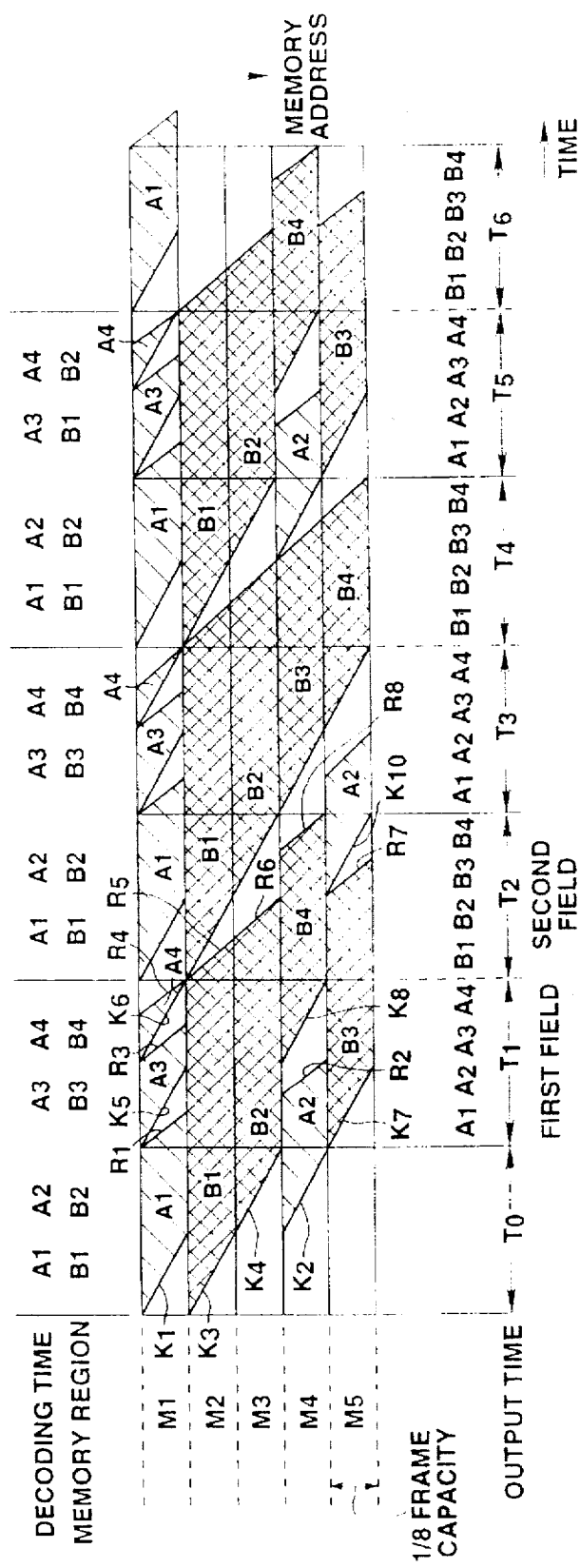
FIGS. 2A and 2B are explanatory views for describing the operation of the first embodiment.
Figure 2B:
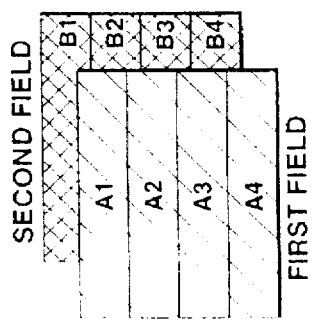

Subsequently, the operation of the embodiment which is arranged in this manner will be described with reference to the explanatory views in FIGS. 2A and 2B. FIG. 2A shows write and readout of the memory 21, while FIG. 2B shows a division method of the image data of a single image plane. In this connection, in the figures, data of odd fields are shown by oblique lines, while data of even fields are shown by net lines.

The decoding processing is similar to the conventional one. Specifically, the coding data is input to the code buffer memory circuit 1. The coding data have the I-, the P- and the B-pictures. It is assumed that the coding data are input in frame order in FIG. 9B, for example. The code buffer memory circuit 1 retains the input coding data in consideration of the coding processing time and the output time, to output the same to the variable-length decoding circuit 2.

The coding data are decoded in variable length by the variable-length decoding circuit 2, are quantized in inversion by the inverse quantization circuit 3, are processed in inverse DCT by the inverse DCT circuit 4, and are returned to data prior to the DCT processing on the coding side so as to be supplied to the adder 5. In this connection, these processings are executed in a block unit.

In a case where the input coding data are those in which the I-picture is coded, the switch 15 gives 0 to the adder 5. Thus, the adder 5 outputs the output from the inverse DCT circuit 4 to the frame memory 12 as it is. The decoding data of each block are stored for a one (1) frame by the frame memory 12, and are read out in display order at predetermined output timing so as to be output through the switches 14 and 16.

In a case where the input coding data are those in which the P-picture is coded, the output from the variable-length decoding circuit 2 is also given to the motion-vector extraction circuit 8. The motion vector which is included in the coding data of the P-picture is extracted by the motion-vector extraction circuit 8 and is given to the motion compensating circuit 10.

The frame memory 12 retains the decoding data of the I-picture as the reference image. The motion compensating circuit 10 reads out the data of the frame memory 12, and uses the motion vector to compensate in motion the data. The data of the reference image which are compensated in motion are given to the adder 5 through the switch 15. The output from the inverse DCT circuit 4 is a decoded predictive error. The adder 5 adds the data of the reference image from the switch 15, to the predictive error, to thereby restore the image data. The image data are stored in the frame memory 11.

Subsequently, it is assumed that the coding data coded based on the B-picture are input. Also in this case, the output from the variable-length decoding circuit 2 is given to the inverse quantization circuit 3 and the inverse DCT circuit 4, and is given also to the motion-vector compensating circuit 8. The predictive error prior to the DCT processing is output from the inverse DCT circuit 4 to the adder 5. On one hand, the motion-vector extraction circuit 8 extracts the motion vector which corresponds to the reference image, from the variable-length decoding output, to output the same to the motion compensating circuits 10 and 9. In this connection, depending upon the predictive mode, there is a case where only one motion vector is extracted.

The frame memories 12 and 11 retain respectively the restored image data of the I-picture and the P-picture as the reference image data. The motion compensating circuits 9 and 10 read out the restored image data thereof, to compensate in motion the same on the basis of the motion vector, to output the same to the switch 15 and the adder 13. Specifically, the motion compensating circuits 9 and 10 correct blocking positions corresponding to the decoding data of a predetermined block which are output from the inverse DCT circuit 4, by the motion vector, to output the block data of the corrected blocking position, as the reference image data which are compensated in motion. The adder 13 adds the outputs from the respective motion compensating circuits 9 and 10 to each other to output the same to the switch 15. In a case where the predictive direction is forward, the switch 15 selects the output form the motion compensating circuit 10, and selects the output from the motion compensating circuit 9 in a case where the predictive direction is rearward. In a case where the predictive direction is in both directions, the switch 15 selects the output from the adder 13 to output the same to the adder 5 as the reference image data which are compensated in motion.

Thus, the adder 5 adds the block data from the inverse DCT circuit 4 and the reference image data in a block unit from the switch 15 to each other to restore the image data of the B-picture in a block unit to thereby output the same to the memory 21.

The block data from the adder 5 are output in a block unit. Specifically, the data of the B-picture from the adder 5 are output sequentially in a block unit from the block line at the upper end of the image plane to the block line at the lower end of the image plane. Now, it is assumed that the image-plane divided number is four (4). The divided image data A1 and B1 in FIG. 2B are first output from the adder 5 in a predetermined ½ field period. In the subsequent ½ field period, the divided image data A2 and B2 are output. In the subsequent ½ field period, the divided image data A3 and B3 are output. In the subsequent ½ field period, the divided image data A4 and B4 are output.

On one hand, it is assumed that the memory 21 has five regions M1 to M5. A capacity of each of the regions M1 to M5 is ⅛ of the frame capacity. Accordingly, it is possible that, at predetermined timing, each of the regions M1 to M5 stores any one data of the divided image data A1 to A4 and B1 to B4.

In FIG. 2A, the axis of abscissa indicates the time of the field unit, while the axis of ordinate indicates the memory addresses which correspond to the regions M1 to M5. As shown in FIG. 2A, the memory control circuit 22 sequentially generates the addresses corresponding to the regions M1 and M2 of the memory 21 a time at which the divided image data A1 and B1 are output from the adder 5, that is, in the first half of the T0 period in FIG. 2A. Thus, as shown in the oblique lines K1 and K3 in FIG. 2A, writing of the divided image data A1 and B1 is executed with respect to the regions M1 and M2 during a ½ field period of the first half of the T0 period.

In the latter half of the subsequent T0 period, the divided image data A2 and B2 are output from the adder 5. The memory control circuit 22 sequentially assigns the addresses corresponding respectively to the regions M4 and M3 at this time. Thus, as shown in the oblique lines K2 and K4 in FIG. 2A, writing of the divided image data A2 and B2 is executed with respect to the regions M4 and M3.

An oblique line part in FIG. 2A indicates the period during which the divided image data A1 to A4 are stored in the memory 21. A net line part shows a period during which the divided image data B1 to B4 are stored in the memory 21. As shown by the oblique line R1 in FIG. 2A, the memory control circuit 22 sequentially assigns a read address with respect to the region M1, from the start timing of the subsequent T1 period. Thus, as shown in FIG. 2A, the divided image data A1 are read out from the region M1 at the first ¼ period of the subsequent T1 period and are output through the switch 16. During a ¼ period subsequent to the T1 period, a readout address of the region M4 is assigned by the memory control circuit 22. The divided image data A2 are read out and are output.

Further, in the first half of the T1 period, the divided image data A3 and B3 are output from the adder 5. The memory control circuit 22 generates the readout address which is indicated by the above-described oblique line R1, with respect to the region M1, and also generates the write address indicated by the oblique line K5. These readout addresses and write addresses are generated in time division, for example. Specifically, the memory control circuit 22 sequentially assigns the readout and write addresses with respect to the region M1 in the first half of the period T1, to store the divided image data A3 to the region M1 while reading out the divided image data A1. In this connection, since a readout rate is twice a write rate, the divided image data A1 are read out prior to the fact that the region M1 is updated by the divided image data A3. Moreover, in the first half of the T1 period, the address of the region M5 is also sequentially assigned so that the divided image data B3 are stored in the region M5.

Similarly, in the latter half of the T1 period, the readout address and write address are assigned with respect to the region M1. The divided image data A4 are written during the ½ field period (oblique line R4), while the divided image data A3 are read out during the ¼ field period (oblique line K6). Furthermore, the write address of the region M4 is assigned so that write of the divided image data B4 indicated by the oblique line K8 is executed. Further, in the last ¼ field period of the T2 period, the write address is generated with respect to the region M1, and readout of the divided image data A4 indicated by the oblique line R4 is executed. Thus, the divided image data A1 to A4 are sequentially read out during the T1 period so that an image of the first field is formed.

In a first half of the subsequent T2 period, the divided image data B1 are read out from the region M2 during the first ¼ field period (oblique line R5). In the subsequent ¼ field period, the divided image data B2 are read out from the region M3 (oblique line R6). It is similar to that in the period T0 that, in the first half of the T2 period, the divided image data A1 and B1 which are outputted from the adder 5 are written respectively to the regions M1 and M2.

In the latter half of the T2 period, the divided image data A2 and B2 are output from the adder 5. In the T0 period, the divided image data A2 have been stored in the region M4. However, since, in the latter half of the T2 period, the divided image data B4 which are stored in the region M4 are not read out, the divided image data A2 are written to the region M5. Specifically, in the latter half of the T2 period, the memory control circuit 22 assigns the readout address and the write address with respect to the region M5, to write the divided image data A2 while reading out the data R3, as shown by the oblique lines R7 and K10. The divided image data B4 are read out from the region M4 during the last ¼ field period of the T2 period. Thus, the divided image data B1 to B4 are sequentially read out in the T2 period so that an image of a second field is formed.

In the subsequent T3 period, readout addresses of the regions M1, M5, M1 and M1 are assigned every ¼ field, and the divided image data A1 to A4 are read out. Further, in the first half of the T3 period, write addresses of the regions M1 and M4 are generated so that the divided image data A3 and B3 are written. In the latter half, write addresses of the regions M1 and M5 are generated so that the divided image data A4 and B4 are written.

In the T4 period, write addresses of the regions M2 to M5 are generated every ¼ field period, and the divided image data B1 to B4 are sequentially read out from these regions. Subsequently, similar operation is repeated.

In this manner, it is possible to use the memory 21 whose capacity is ⅝ of the frame capacity, to output, in interlacement, the B-picture.

Figure 13A:
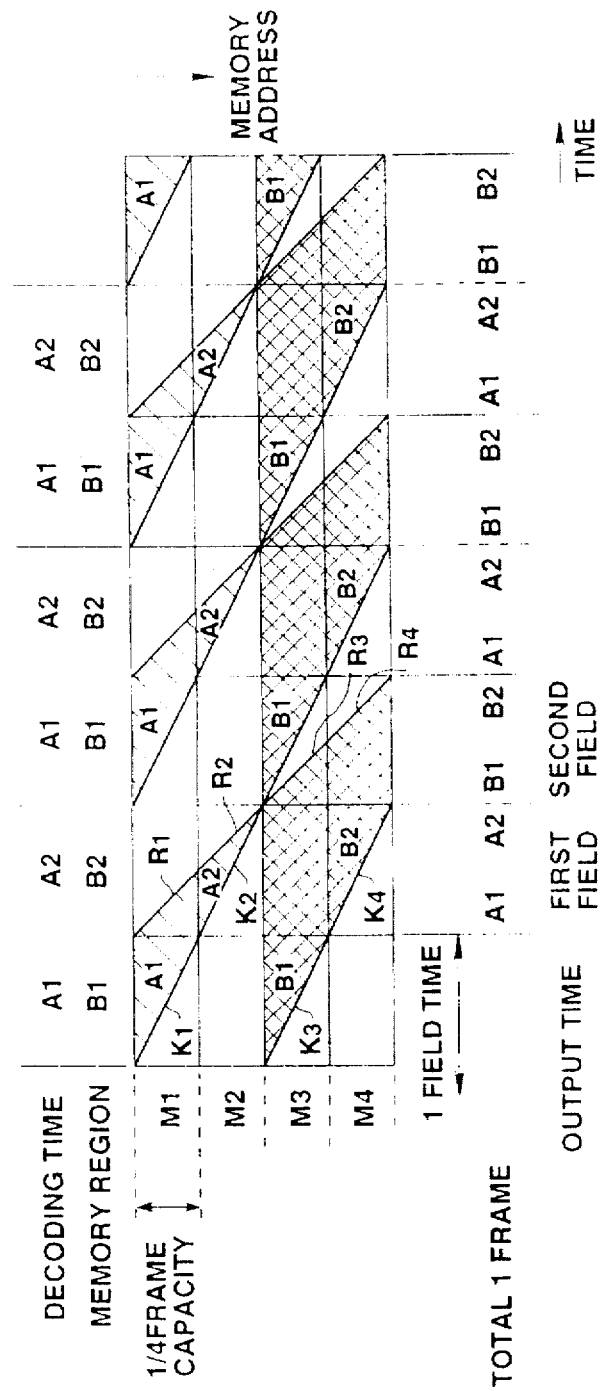
FIGS. 13A and 13B are explanatory views for describing interlacement conversion in the related art of the image decoding apparatus.
Figure 13B:
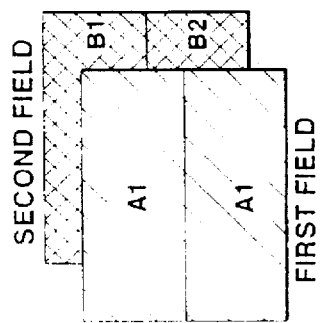

Thus, the present embodiment is arranged such that the divided image data of a plurality of regions on the image plane are written to a single memory region. Time during which each divided image data are written to the memory 21 and time during which the divided image data are read out from the memory 21 are decided in dependence upon the field to which the divided image data belong and a position on the image plane. Depending upon the divided image data, the divided image data are stored in the memory 21 only during relatively short time. The present embodiment stores the plurality of divided image data to one or a single (1) region of the memory 21, as will be clear from comparison between FIG. 2A and FIG. 13A, so that the period during which the memory is not used is reduced, thereby reducing the memory capacity.

For example, it is necessary that the divided image data B3 and the divided image data B4 are retained in the memory during the same period necessary. However, during a period from completion of readout of the divided image data B3 of the predetermined frame to write start of the divided image data B4 of the subsequent frame, there exists a space or room only to write and read out the divided image data A2.

For this reason, the divided image data B3 and the divided image data A2 which are started to be written from a point of time the readout of the divided image data B3 has been completed are made to a group or set, and the data of this group and the divided image data B4 are written alternatively to the regions M4 and M5 at intervals of one (1) frame or every one (1) frame. The arrangement is such that the divided image data A2 are written to the region M5 the same as the divided image data A3 which has been completed in readout, and the divided image data B4 are written to the region M4 after readout of the divided image data A2 has been completed.

Moreover, as indicated in the region M1, for example, a difference between the readout rate and the write rate is utilized to generate the write address and the readout address in the same period so that a write operation is executed while the data is read out. Thus, utilization efficiency of the memory 21 is further improved.

In this manner, the memory is effectively used without stopping the output of the decoded image data, to convert in interlacement the image data having a one (1) frame unit by a less memory capacity. Any of the capacity of each of the regions M1 to M5 of the memory 21 is one eighth (⅛) of the frame capacity. It is possible to reduce the capacity of the memory 21 to a capacity for 0.625 frame. For example, if the present embodiment is adopted or employed in a PAL system, it is possible to arrange the total or all memories required for a decoder, by the use of memories each having a 16 Mbit capacity, for example.

In connection with the above, for example, the divided image data A1, A3 and A4 are written to the region M1, and the divided image data B1 and B2 are written respectively to the regions M2 and M3. However, the data may be written to the other regions. It will be clear that, if the memory has five (5) regions, the data are allocated to any regions and are written thereto.

Figure 3A:
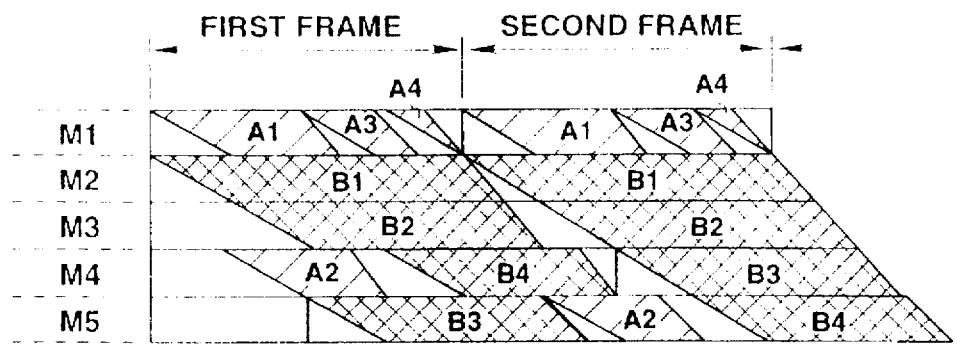
FIGS. 3A-3C are explanatory views for describing the operation of the first embodiment.
Figure 3B:
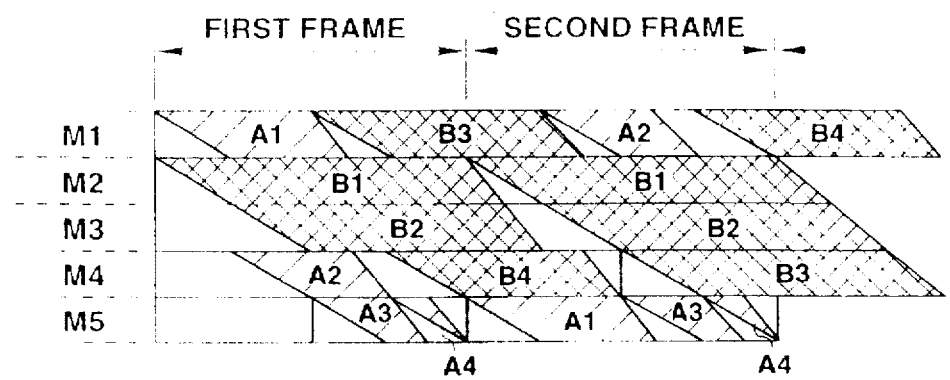
Figure 3C:
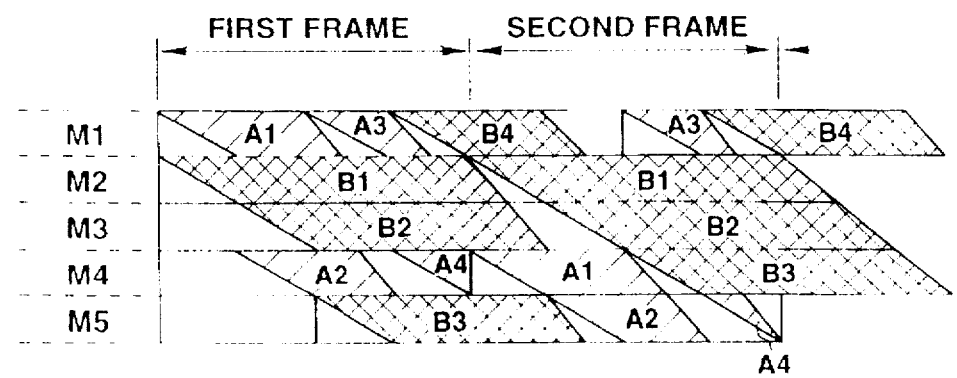

Furthermore, a pattern in which the divided image data A1 to A4 and B1 to B4 are written should not be limited to the pattern in FIG. 2A. FIGS. 3A to 3C are explanatory views for describing the other write patterns. FIG. 3A shows the pattern the same as FIG. 2A, while FIGS. 3B and 3C show the other patterns.

Regions which store the respective data should be decided so that storage times of the divided image data A1 to A4 and B1 to B4 with respect to the same region do not overlap with each other. For example, readout of the divided image data A1 stored in the region M1 is started from the latter half of the first frame, as shown in FIG. 3A. Accordingly, it is possible that the output from the adder 5 writes the divided image data A3, B3, A4 and B4 which are executed subsequent to this time, to the region M1. In this case, it will be clear, that it is superior in efficiency to write the divided image data A3 and B3, than if the divided image data A4 and B4 are written to this region.

If the efficiency is considered, combinations of 2 (two) continuous data which are written to the same region are as shown in below Table 1:

TABLE 1

| IMMEDIATELY BEFORE DATA | WRITABLE DATA | IMMEDIATELY BEFORE DATA | WRITABLE DATA |
| --- | --- | --- | --- |
| A1 | A3 | A3 | A4 |
|  | B3 |  | B4 |
| B1 | (A2) | B3 | A2 |
|  | (B2) |  | (B2) |
| A2 | A4 | A4 | A1 |
|  | B4 |  | (B1) |
| B2 | (A2) | B4 | A3 |
|  | B2 |  | B3 |

Moreover, since the divided image data B1 and B2 are long in storage time, the divided image data B1 and B2 are independently written respectively to the predetermined regions. On the basis of these conditions, patterns shown in FIGS. 3A-3C are considered. For example, FIG. 3B is an example which writes the divided image data B3 subsequent to the divided image data A1, regarding the region M1. Furthermore, as described above, the divided image data B3 and the divided image data A2 are made to a set or a group, and the write region is changed in the region M1 and M4, regarding the data of this group. Further, FIG. 3C is an example which writes the divided image data A3 subsequent to the divided image data A1. Also in this example, the divided image data B3 and the divided image data A2 are made to a group, and the write region is alternately changed in the region M4 and M5, regarding the data of this set or group.

Moreover, for example, the divided image data A1 and the divided image data B1 are coincident with each other in write start time. Accordingly, it will be clear that a region onto which the data subsequent to the divided image data A1 are written and a region onto which the data subsequent to the divided image data B1 are written may be exchanged for each other. This is also possible for the other data in which write start times are coincident with each other.

Figure 4:
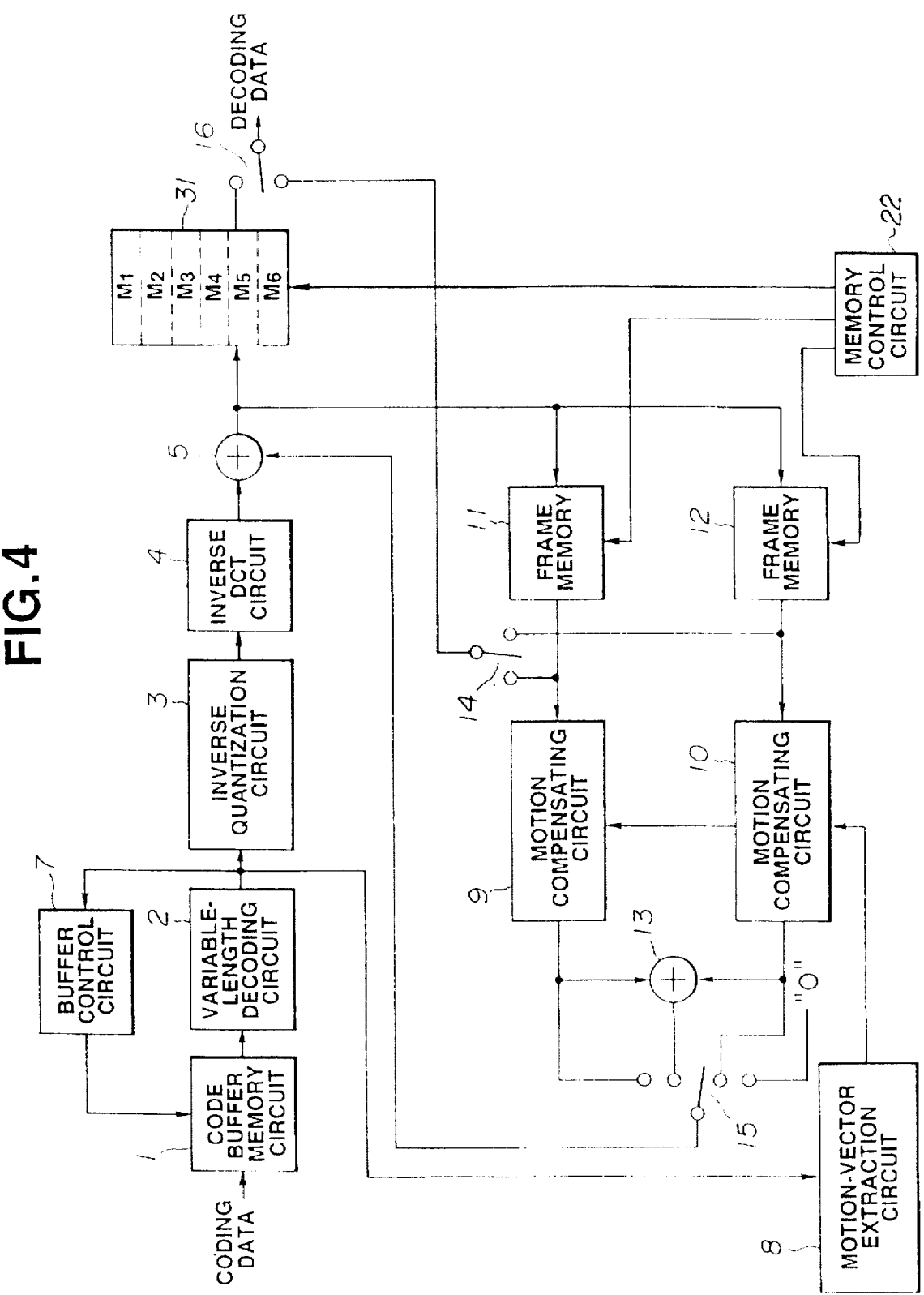
FIG. 4 is a block diagram showing a second embodiment of the present invention.

FIG. 4 is a block diagram showing another embodiment of the present invention. In FIG. 4, the same reference numerals are applied to elements that are the same as those in FIG. 1, and a description thereof will be omitted.

The present embodiment adopts a memory 31 in place of the memory 21 in FIG. 1. The memory 31 is divided into six (6) regions M1 to M6. Each of the regions has a capacity that is ⅛ of the frame capacity. Specifically, in this embodiment, a capacity of the memory 31 is ⅝ of the frame capacity. The arrangement is such that the memory 31 is controlled in write and readout thereof by the memory control circuit 22 to store decoding data of the B-picture which are input sequentially, and to read out the same in order of interlacement, to thereby output the same to the switch 16.

Figure 5A:
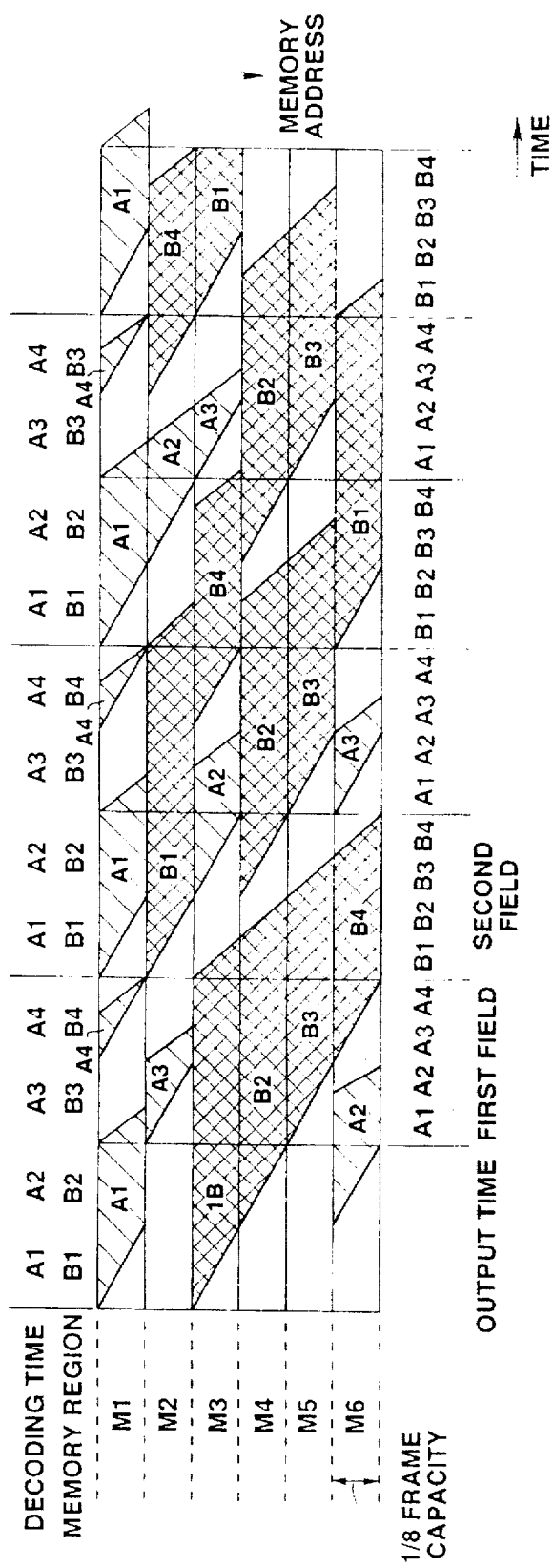
FIGS. 5A and 5B are explanatory views for describing the operation of the second embodiment in FIG. 4.
Figure 5B:
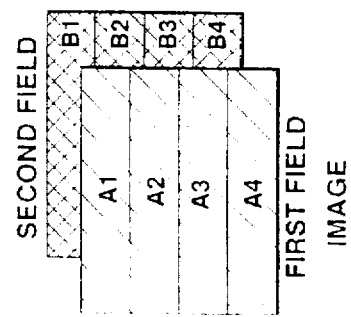

Subsequently, the operation of the embodiment which is arranged in this manner will be described with reference to the explanatory views in FIGS. 5A and 5B. FIGS. 5A and 5B correspond respectively to FIGS. 2A and 2B. FIG. 5A shows write and readout of the memory 31, while FIG. 5B shows a division method of the image data of one (1) image plane. Moreover, also in FIGS. 5A and 5B, data of odd fields are shown by oblique lines, while data of even fields are shown by net lines.

In the embodiment in FIG. 1, there are relatively many patterns where readout timing of the data from a predetermined region and write timing of the other data with respect to this region are coincident with each other. On the contrary, the present embodiment can take a pattern which has a time scope or room from readout completion to write with respect to the same region. Thus, memory control is made easy, and it is possible to relieve limitation on circuit design.

If it is assumed that, in any region, predetermined time is provided between the timing of readout completion of the stored data and the timing of the write start of the subsequent data, then, combinations of the two continuous or consecutive data which are written to the same region are as shown in the below Table 2. In this connection, parentheses indicate the frame numbers.

TABLE 2

| IMMEDIATELY BEFORE DATA | WRITABLE DATA | IMMEDIATELY BEFORE DATA | WRITABLE DATA |
| --- | --- | --- | --- |
| A1 (n) | A4 (n) | A3 (n) | A1 (n + 1) |
|  | B4 (n) |  | B1 (n + 1) |
| B1 (n) | A2 (n + 1) | B3 (n) | A3 (n + 1) |
|  | B2 (n + 1) |  | B3 (n + 1) |
| A2 (n) | A4 (n) | A4 (n) | A1 (n + 1) |
|  | B4 (n) |  | B1 (n + 1) |
| B2 (n) | A2 (n + 1) | B4 (n) | A3 (n + 1) |
|  | B2 (n + 1) |  | B3 (n + 1) |

FIG. 5A shows an example in which the divided image data A1 and the divided image data A4 are alternately written to the region M1. Only the divided image data B2 and B3 are written to the regions M4 and M5, respectively.

Data are written to the region M2 in order of the divided image data A3, B1, A2 and B4. Further, data are written to the region M3 in order of the divided image data B1, A2, B4 and A3, and data written to the region M6 in order of the divided image data A2, B4, A3 and B1. Thus, as shown in FIG. 5A, interlacement conversion, which has time between readout and write, is possible.

Figure 6A:
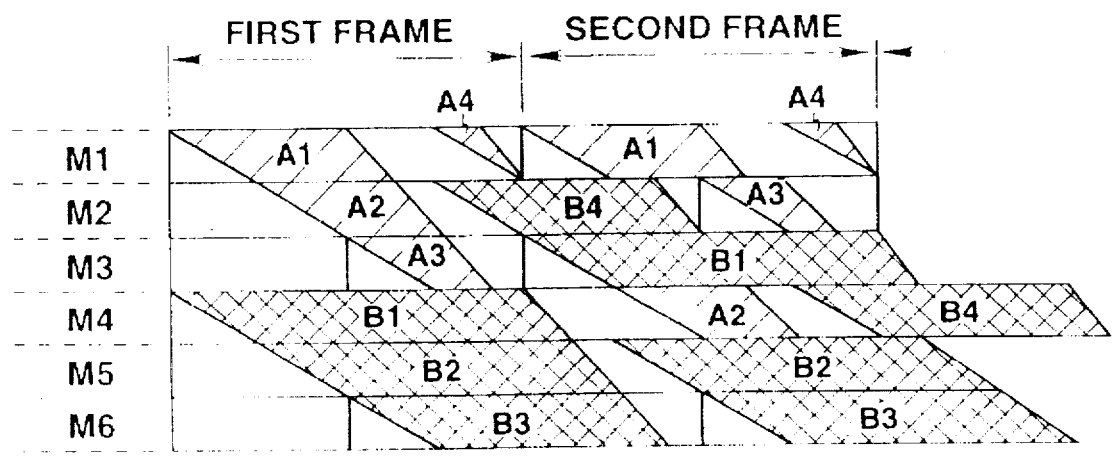
FIGS. 6A and 6B are explanatory views for describing operation of the second embodiment in FIG. 4.
Figure 6B:
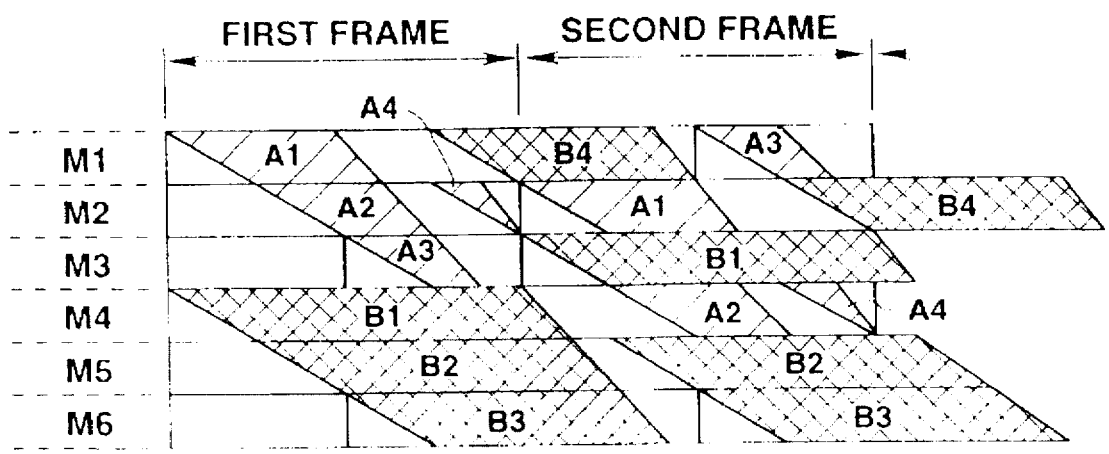

Similarly to the embodiment in FIG. 1, there is no case where the present embodiment is specified to the pattern in FIG. 5A. FIGS. 6A and 6B are explanatory views showing the other write patterns in the present embodiment.

In any of FIGS. 6A and 6B, the pattern is made to a pattern in accordance with restriction in the above Table 2. Moreover, it is similar to the embodiment in FIG. 1 that, in a case where the write start times of data which are written to respective different regions are coincident with each other, the write data may be exchanged in these regions.

In this manner, in the present embodiment, the memory 43 is arranged by the capacity for 0.75 frame so that interlacement conversion is possible.

Figure 7:
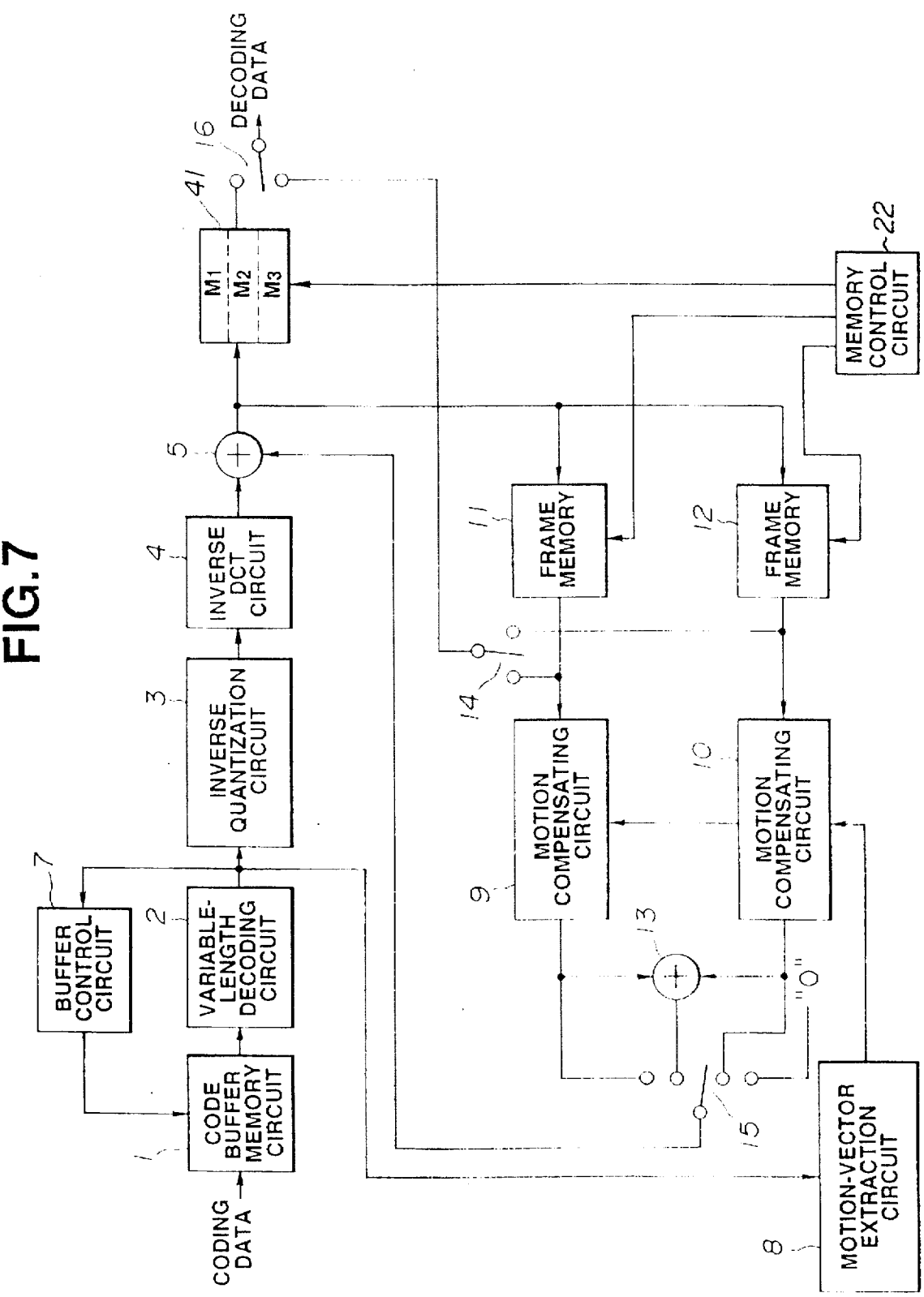
FIG. 7 is a block diagram showing a third embodiment of the present invention.
Figure 10:
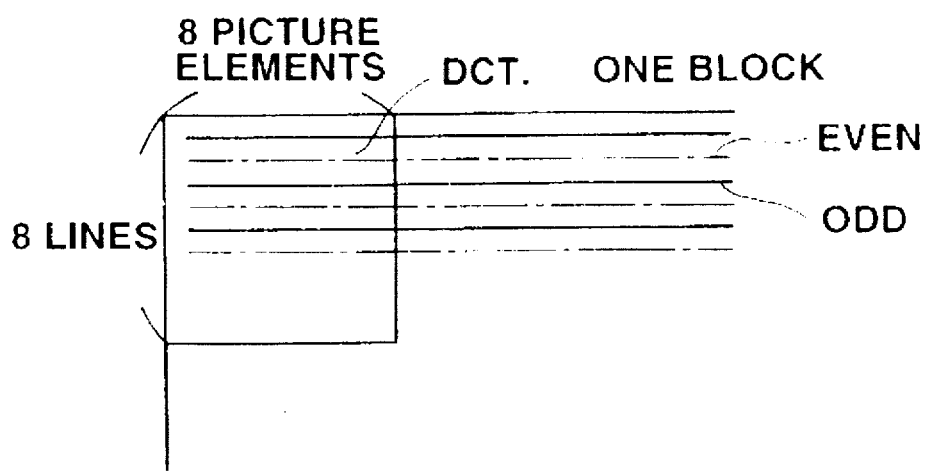
FIG. 10 is an explanatory view for describing blocking.

FIG. 7 is a block diagram showing another embodiment of the present invention. In FIG. 7, the same reference numerals are applied to constitutional elements the same as those in FIG. 4, and description thereof will be omitted.

The present embodiment adopts a memory 41 in place of the memory 31. The memory 41 is divided into three regions M1 to M3. Each of the regions has a capacity that is ¼ of the frame capacity. Specifically, in this case, the capacity of the memory 41 is ¾ of the frame capacity. The arrangement is such that write and readout of the memory 41 are controlled by the memory control circuit 22 so that the memory 41 stores therein the decoding data of the B-picture which are sequentially input to sequentially read out the same in interlacement order, to output the same to the switch 16.

Subsequently, the operation of the embodiment which is arranged in this manner will be described with reference to explanatory views of FIGS. 8A-8C. FIGS. 8A and 8C correspond respectively to FIGS. 5A and 5B. FIG. 8A shows write and readout of the memory 41, while FIG. 8C shows a division method of the image data of one (1) image plane. Furthermore, FIG. 8B shows the other write patterns which are considered in the present embodiment. Also, in FIGS. 8A-8C, data of odd fields are shown by oblique lines, while data of even fields are shown by net lines.

In the embodiment in FIG. 4, the image-plane divided number is 4 (four), the image data of one (1) frame are divided into eight (8) divided image data A1 to A4 and B1 to B4, and write to the memory is controlled every divided data. The higher or larger the image-plane divided number, it is possible to effectively use the memory. However, if the image-plane divided number is made high, memory control becomes complicated. In order to relatively facilitate the memory control, in the present embodiment, an example is shown in which the image-plane divided number is set to 2.

The memory control circuit 22 divides into two (2) each of the first and second fields in a vertical direction of the image plane and writes the divided image data A1 and A2, which correspond respectively to the two regions of the first field, and the divided image data B1 and B2, which correspond respectively to the two regions of the second field, into the regions M1 to M3 of the memory 41. The divided image data A1 and A2 are relatively short in time which are stored in the memory 41. Thus, the readout start time of the divided image data A1 and the write start time of the divided image data A2 are coincident with each other. Further, since a readout rate with respect to each data is twice a write rate,
it is possible to write the divided image data A1 and A2 to the same region.

The memory control circuit 22 writes the divided image data A1 and A2 to the region M1. Further, the memory control circuit 22 writes the divided image data B1 and B2 respectively to the regions M2 and M3. Thus, as shown in FIG. 8A, it is possible to convert, in interlacement, the frame image to output the same.

FIG. 8B shows an example in which the divided image data A1, B2 and A2 are made to a group, and are written while being changed over in the region M1 and the region M2, and the divided image data B1 are written to the region M2. Also in this case, interlacement conversion is executed normally.

In this manner, the present embodiment has such advantages that the image-plane divided number is reduced whereby the memory control can be facilitated.

In this invention, it is apparent that working modes different in a wide range can be formed on the basis of this invention without departing from the spirit and scope of the invention. This invention is not restricted by any specific embodiments except being limited by the appended claims.

What is claimed is:

1. An image decoding apparatus comprising:

decoding means receiving coding data, which includes bidirectional predictive coding data using forward and rearward reference images, for decoding said coding data in a predetermined block unit to output decoding data;

memory means, having a plurality of memory regions each having a capacity that corresponds to a part of a predetermined divided number of a total capacity necessary to store said decoding data for one (1) frame, receiving said decoding data in a frame arrangement which is output from said decoding means after being processed by a decoding processing with respect to said bidirectional predictive coding data, for storing said decoding data in said memory regions and for reading out said stored data in a display order to obtain an interlaced output; and control means for dividing an image plane into divided image regions whose number is ½ of said predetermined divided number in correspondence to a position in a vertical direction, to control write and readout of said memory means for every group of divided image data that are defined by a column of said decoding data which correspond respectively to the said divided image regions of said predetermined divided number of first and second fields, said control means controlling write and readout with respect to said memory means in consideration of input and output time of said divided image data, thereby storing a plurality of said divided image data corresponding respectively to different divided image regions to a common memory region of said memory means to obtain an interlaced output from said memory means, wherein said number that is ½ of said predetermined divided number is 4 (four), and wherein said memory means has 5 (five) regions each having a capacity that is ⅛ of a total capacity necessary to store said decoding data for 1 (one) frame.

2. An image decoding apparatus comprising:

decoding means receiving coding data, which includes bidirectional predictive coding data using forward and rearward reference images, for decoding said coding data in a predetermined block unit to output decoding data;

memory means, having a plurality of memory regions each having a capacity that corresponds to a part of a predetermined divided number of a total capacity necessary to store said decoding data for one (1) frame, receiving said decoding data in a frame arrangement which is output from said decoding means after being processed by a decoding processing with respect to said bidirectional predictive coding data, for storing said decoding data in said memory regions and for reading out said stored data in a display order to obtain an interlaced output; and control means for dividing an image plane into divided image regions whose number is ½ of said predetermined divided number in correspondence to a position in a vertical direction, to control write and readout of said memory means for every group of divided image data that are defined by a column of said decoding data which correspond respectively to the said divided image regions of said predetermined divided number of first and second fields, said control means controlling write and readout with respect to said memory means in consideration of input and output time of said divided image data, thereby storing a plurality of said divided image data corresponding respectively to different divided image regions to a common memory region of said memory means to obtain an interlaced output from said memory means, wherein said number that is ½ of said predetermined divided number is 4 (four), and wherein said memory means has 6 (six) regions each having a capacity that is ⅛ of a total capacity necessary to store said decoding data for 1 (one) frame.

3. An image decoding apparatus comprising:

decoding means receiving coding data, which includes bidirectional predictive coding data using forward and rearward reference images, for decoding said coding data in a predetermined block unit to output decoding data;

memory means, having a plurality of memory regions each having a capacity that corresponds to a part of a predetermined divided number of a total capacity necessary to store said decoding data for one (1) frame, receiving said decoding data in a frame arrangement which is output from said decoding means after being processed by a decoding processing with respect to said bidirectional predictive coding data, for storing said decoding data in said memory regions and for reading out said stored data in a display order to obtain an interlaced output; and control means for dividing an image plane into divided image regions whose number is ½ of said predetermined divided number in correspondence to a position in a vertical direction, to control write and readout of said memory means for every group of divided image data that are defined by a column of said decoding data which correspond respectively to the said divided image regions of said predetermined divided number of first and second fields, said control means controlling write and readout with respect to said memory means in consideration of input and output time of said divided image data, thereby storing a plurality of said divided image data corresponding respectively to different divided image regions to a common memory region of said memory means to obtain an interlaced output from said memory means, wherein said number that is ½ of said predetermined divided number is 2 (two), and wherein said memory means has 3 (three) regions each having a capacity that is ¼ of a total capacity necessary to store said decoding data for 1 (one) frame.

4. An image decoding apparatus comprising:

decoding means receiving coding data which includes bidirectional predictive coding data using forward and rearward reference images for decoding said coding data in a predetermined block unit so as to be output therefrom;

memory means having not less than (N/2)+1, but less than N, memory regions each having a capacity which is 1/N of a decoding image data capacity necessary to store one frame, where N is an integer, said memory storing in said memory regions said decoding image data or a frame arrangement which are output from said decoding means; and control means for making an N/2 division of said decoding image data, writing said decoding image data to said memory regions for every divided decoding image data of first and second fields by respective divisions, reading out aid divided decoding image data from said memory regions in a display order, and writing different divided decoding image data belonging to a same frame image to said memory regions made empty by said reading out.

5. An image decoding apparatus according to claim 4, wherein said coding data is a video signal coded according to a PAL system.

6. An image decoding apparatus according to claim 4, wherein said control means determines a timing for writing respective divided decoding image data to said memory regions as well as a timing for reading out said divided decoding image data from said memory regions based on a field to which said respective divided decoding image data belongs and a position of said divided decoding image data on an image plane.

7. An image decoding apparatus according to claim 4, wherein said control unit determines a timing for writing respective divided decoding image data to said memory regions as well as a timing for reading out said divided decoding image data from said memory regions based on a field to which said respective divided decoding image data belongs and a position of said divided decoding image data on an image plane.

8. An image decoding apparatus comprising:

a decoder receiving coding data which includes bidirectional predictive coding data using forward and rearward reference images and decoding said coding data in a predetermined block unit so as to be output therefrom;

a memory having not less than (N/2)+1 but less than N memory regions each having a capacity which is 1/N of a decoding image data capacity necessary to store one frame, where N is an integer, said memory storing in said memory regions said decoding image data or a frame arrangement which are output from said decoder; and control unit making an N/2 division of said decoding image data, writing said decoding image data to said memory regions for every divided decoding image data of first and second fields by respective divisions, reading out aid divided decoding image data from said memory regions in a display order, and writing different divided decoding image data belonging to a same frame image to said memory regions made empty by said reading out.

* * * * *